United States Patent [19]
Belter

[11] Patent Number: 5,618,047
[45] Date of Patent: Apr. 8, 1997

[54] MOLDED GASKET WITH A MULTIPLE COMPONENT REINFORCING ELEMENT

[75] Inventor: Jerome G. Belter, Mt. Prospect, Ill.

[73] Assignee: Dana Corporation, Toledo, Ohio

[21] Appl. No.: 404,212

[22] Filed: Mar. 14, 1995

[51] Int. Cl.$^6$ .................................................. F16J 15/10
[52] U.S. Cl. ........................ 277/192; 277/235 B; 277/220
[58] Field of Search ............................... 277/227, 235 B, 277/180, 189, 192, 199, 220, 221

[56] References Cited

U.S. PATENT DOCUMENTS

| | | | |
|---|---|---|---|
| 4,535,996 | 8/1985 | Cardis et al. | 277/180 |
| 4,572,522 | 2/1986 | Smagatz | 277/235 B |
| 4,690,413 | 9/1987 | Adkins | 277/192 |
| 5,121,932 | 6/1992 | Goldman et al. | 277/166 |
| 5,149,108 | 9/1992 | Leiszter | 277/235 B |
| 5,161,808 | 11/1992 | Walters | 277/235 B |
| 5,236,203 | 8/1993 | Uchida et al. | 277/235 B |

FOREIGN PATENT DOCUMENTS 2659122   9/1991   France ............................... 277/235 B Primary Examiner—William A. Cuchlinski, Jr.
Assistant Examiner—Christina Annick
Attorney, Agent, or Firm—Rader, Fishman and Grauer

[57] ABSTRACT

A gasket for sealing between two opposed surfaces with a rigid carrier to which a flexible sealing element is bonded includes at least two carrier members. The carrier members define continuous circumferentially closed inner and outer peripheries. A first carrier member has a first overlapping portion at a first end and a second overlapping portion at a second end. A second carrier member has a first overlapping portion at a first end and a second overlapping portion at a second end. The second overlapping portion of the first member is overlapped by the first overlapping portion of the second member.

6 Claims, 2 Drawing Sheets

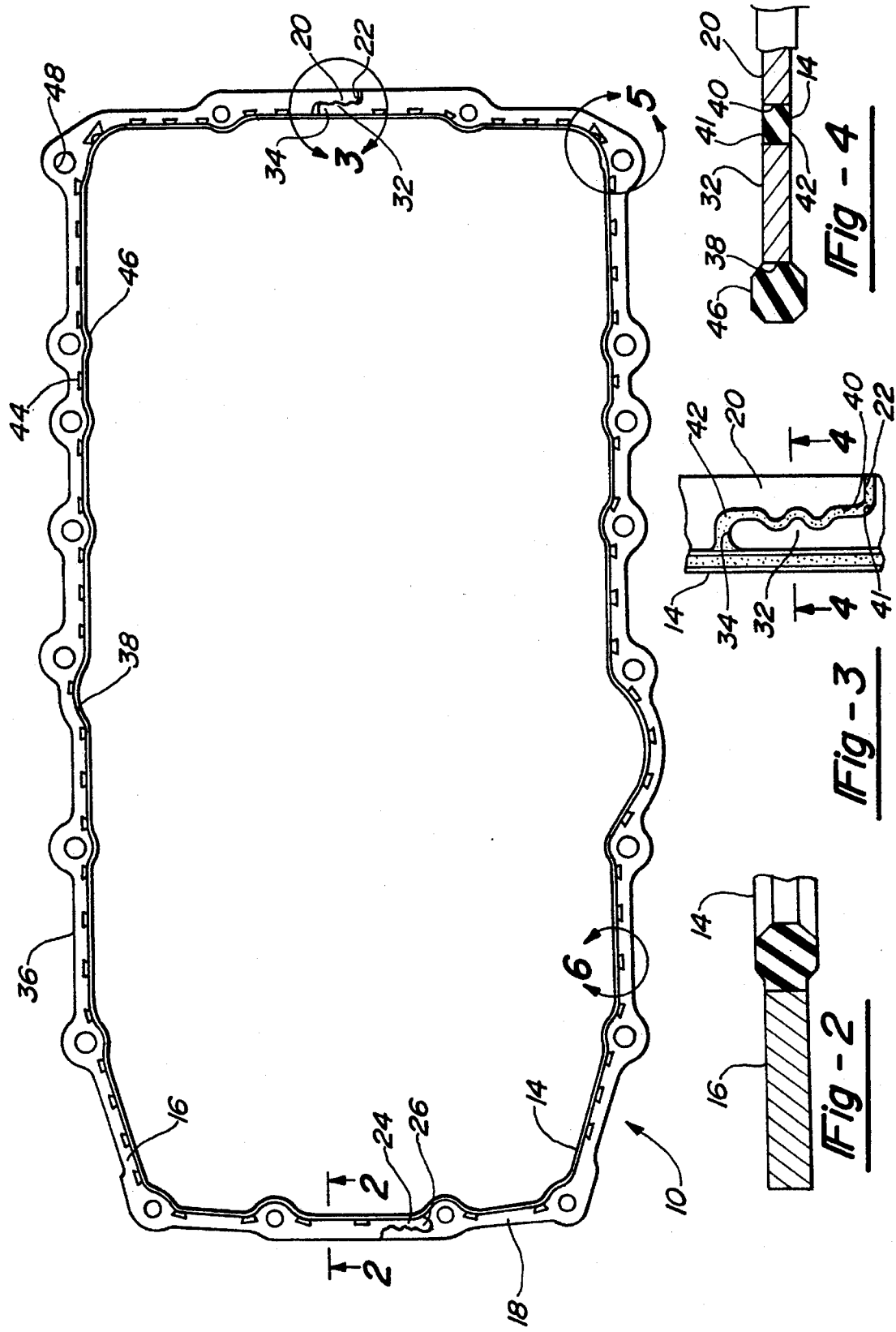

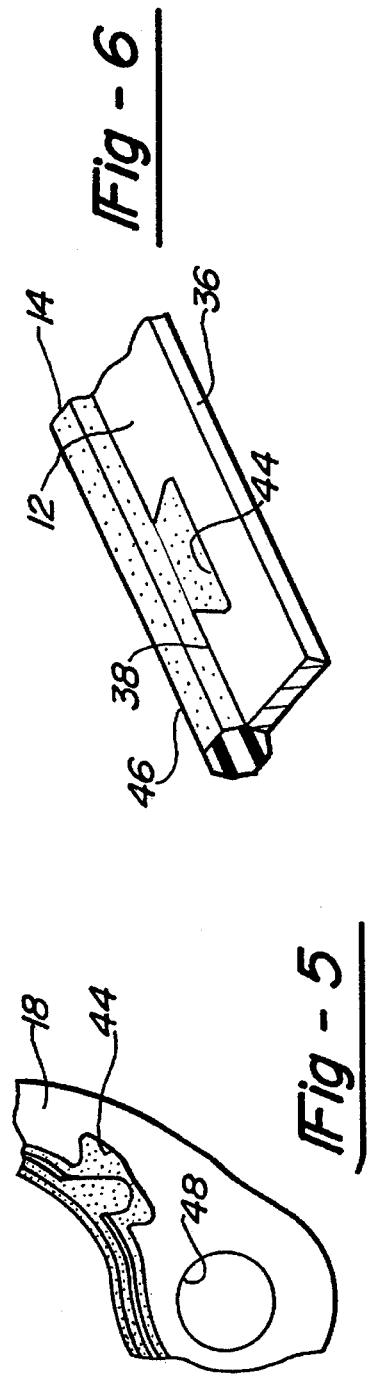
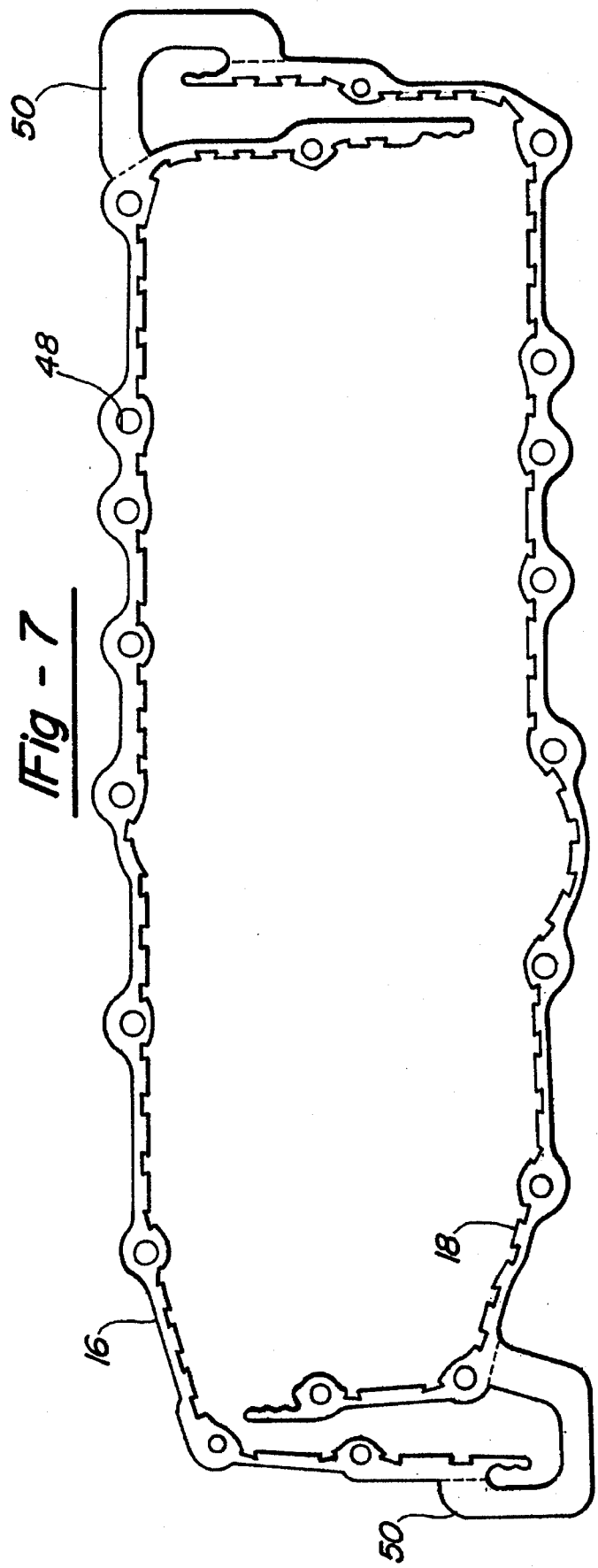

MOLDED GASKET WITH A MULTIPLE COMPONENT REINFORCING ELEMENT

FIELD OF THE INVENTION

This invention is directed to the field of gaskets, and more particularly to gaskets having a rigid carrier supporting a flexible sealing member.

BACKGROUND OF THE INVENTION

Gaskets having a rigid reinforcing member, or carrier, and a flexible sealing member bonded to the carrier are known. Carriers are commonly formed by either stamping them from metal, or molding them from structural plastic. When a carrier is stamped of a single piece of metal, a large amount of scrap, also variously called offal, is generated and the entire center portion is typically scrapped or discarded. Molding carriers from structural plastic generates much less scrap material than stamping, but requires a very large mold to accommodate the size of the carrier, which again results in a large center portion.

In the prior art, carriers have been split into two parts or members along a single line to reduce the amount of stamping offal generated, or to reduce the size of die needed to blank the carriers. The two carrier members are butted up against each other in a gasket mold cavity for forming a flexible sealing element. An elastomer is injected into the cavity, forming the flexible sealing element of the gasket, which bonds to the carrier members. When a finished gasket is subsequently removed from the mold, the gasket tends to bend along the split line. The flexible member, while suited to hold the carrier members together, and to serve as the seal, is often unable to sustain bending forces from the weight of one carrier member when the gasket is held by the other carrier member. As a result, if the gasket is not handled carefully, it will bend or fold along the split line, potentially damaging the sealing element. Known gaskets employing split carriers are highly subject to such bending, even when merely being picked up for installation. The tendency to bend increases the risk of the gasket being damaged during handling.

SUMMARY OF THE INVENTION

A gasket has a rigid carrier to which a flexible sealing element is bonded for sealing disposition between two opposed surfaces. The rigid carrier is defined by two carrier members which together form a continuous closed circumference. A first carrier member has a first overlapping portion at a first end and a second overlapping portion at a second end. A second carrier member has a first overlapping portion at a first end and a second overlapping portion at a second end. The overlapping portions of respective members are operative to secure the members together.

An advantage of the presently disclosed gasket is found in overlapping portions of the carrier members which resist bending at joints between the members. Overlapping portions enable the provision of a gasket having a rigid carrier formed of a plurality of members resisting bending and thereby minimizing the potential for damage to the gasket.

BRIEF DESCRIPTION OF THE DRAWINGS

FIG. 1 is a plan view of a gasket constructed in accordance with the present invention.

FIG. 2 is an enlarged sectional view shown in the direction of arrows 2—2 of the gasket of FIG. 1.

FIG. 3 is an enlarged view of a portion of the gasket within circle 3 of FIG. 1.

FIG. 4 is an enlarged cross-sectional view of the gasket in the direction of arrows 4 of FIG. 3.

FIG. 5 is an enlarged view of a portion of the gasket within the circle 5 of FIG. 1.

FIG. 6 is an enlarged perspective view of a portion of the gasket within the circle 6 of FIG. 1.

FIG. 7 is a plan view of a gasket reinforcing element of the type employed in this invention.

DESCRIPTION OF A PREFERRED EMBODIMENT

A gasket 10 shown in FIGS. 1 and 2 has a rigid carrier 12 to which a flexible sealing element 14 is bonded. The carrier 12 has a first member 16 and a second member 18 joined together, thereby defining a continuous closed circumference. The gasket 10 shown in the figures is configured for use as an oil pan gasket for an internal combustion engine and has features described below particularly advantageous for use with an internal combustion engine.

The first member 16 of the carrier 12 has a first overlapping portion 20 extending from a first end 22 and a second overlapping portion 24 extending from a second end 26. The second member 18 of the carrier 12 has a first overlapping portion 28 extending from a first end 30 of the second member and a second overlapping portion 32 extending from a second end 34.

The first overlapping portions 20 and 28 are outer extensions extending along an outer periphery 36 of the carrier 12. The second overlapping portions, 24 and 32, are inner extensions, extending along an inner periphery 38 of the carrier 12. The first portions 20 and 28 and the second portions 24 and 32 overlap in the assembled gasket 10. A plurality of complimentary undulations are provided on opposing faces 40 and 41 respectively of the first and second overlapping portions. There is a gap 42 between each of the first and second overlapping portions permitting entry of a portion of the flexible sealing element 14, as shown in FIGS. 3 and 4.

The flexible sealing element 14, is formed of an elastomer, such as silicone rubber, which is bonded to an inner surface of the rigid carrier 12. The rigid carrier 12 maintains the basic shape of the flexible sealing element 14. Silicone rubber is a preferred material for use in an oil pan gasket because of its resistance to the anticipated temperature extremes and its imperviousness to engine oil. The rigid carrier 12 has a plurality of dove tailed shaped openings 44 along the inner periphery 38. The sealing element 14 fills the dove tailed shaped openings 44, as shown in FIGS. 5 and 6, thereby providing a mechanical engagement between the carrier 12 and the flexible sealing element 14 which supplements the bond therebetween. Additionally, the flexible sealing element 14 also defines a sealing bead 46 of hexagonal cross section disposed along the inner periphery 38 as shown in FIG. 2. The hexagonal cross section provides two points of sealing contact with each of a pair of opposed sealing surfaces when compressed therebetween.

The flexible sealing element 14 also fills the gaps 42 between the overlapping first and second portions of the first and second members of the carrier 12. The overlapping portions of the first and second members 16 and 18 have undulated facing surfaces 40 and 41, respectively, providing a relatively large amount of overlapping surface area to which the portion of the flexible sealing element filling the gap 42 is bonded. This increases the strength of the interface or joints between the first and second members 16 and 18. These joints, with their large overlapping areas, resist bending deflection between the first and second members 16 and 18. This is in contrast to previously known reinforced gaskets having first and second carrier members separated along a single split line. Such gaskets tend to easily deflect along the split line with normal handling of the gaskets.

The joints defined by the overlapping portions of the carrier members 16 and 18 are offset from one another instead of being directly across the gasket 10 from each other. The offset supplements the bonding of the flexible sealing element 14 with the overlapping portions in reducing the tendency of the gasket 10 to bend through the joints.

The gasket 10 includes a plurality of apertures 48 distributed around the rigid carrier 12. These apertures 48 accommodate the passage of clamping bolts (not shown) therethrough as well as any locating pins (not shown) used to align the gasket with mating parts.

A suitably rigid carrier 12 can be formed either by stamping the carrier members 16 and 18 from a metal such as aluminum, or by molding them of any suitable structural plastic such as a thermoplastic. A two piece stamped carrier of the configuration shown in FIG. 7 offers an approximately thirty percent (30%) reduction in the size of the forming blank and a proportionately greater reduction in the amount of offal over a single piece stamping of the same carrier. The first and second members 16 and 18 of FIG. 7 have connecting legs 50 which help maintain the integrity of the parts, and are removed only just prior to molding the flexible sealing element 14 to them.

FIG. 7 also illustrates a possible configuration of an injection molded plastic carrier with first and second members 16, 18 simultaneously formed in a single mold. Such a configuration offers an appreciable reduction in the size of the die, with only a small material penalty resulting from the use of the connecting legs 50 as runners between the first and second members 16, 18.

The gasket 10 is formed in the following manner. The carrier members 16 and 18 are formed either by stamping them of metal, or by molding them from plastic. The finished metal stampings 16 and 18 have the connecting legs 50 removed, and are cleaned as necessary prior to placing them in a gasket mold (not shown). Alternatively, plastic molded first and second members 16 and 18 would have the runners 50 removed and would be cleaned as necessary.

The carrier members 16 and 18 are then placed in the gasket mold (not shown). The gasket mold has pins (not shown) received by the apertures 48 of the carrier members 16 and 18 when they are placed in the mold. The pins are located to position the first and second members 16 and 18 relative to each other to provide the gaps 42 between the first member 16 and the second member 18. The mold, when closed, defines a cavity enclosing the first and second members 16 and 18 and having a void for forming the bead 46 inside the inner periphery 42. The void for the bead 46 connects with the dove tail openings 44 and with the gaps 42 of the carrier members 16 and 18.

With the first and second members 16 and 18 disposed in the mold, the mold is closed and the desired elastomer injected into the mold cavity. The elastomer moves into that part of the cavity within the mold not occupied by the first and second members 16, 18. After the elastomer has cured, the mold is separated, allowing removal of the finished gasket 10 comprising the first and second members 16, 18 and the flexible elastomeric sealing element 14.

It should be appreciated that while the carrier 12 was divided up into only two members in this embodiment, the carrier 12 could have alternatively been broken down into any number of smaller pieces.

Other aspects and advantages of this invention can be obtained from a study of the drawings, the disclosure and the appended claims.

I claim:

1. A molded gasket for sealing between two opposed surfaces, comprising:

a rigid carrier formed of at least two carrier members cooperatively defining a substantially closed annulus having an inner periphery and an outer periphery, said carrier members meeting at a joint;

said joint interconnecting a first and a second member, said joint characterized by a first longitudinal extension of said first member only along said inner periphery, said first longitudinal extension and the unextended outer periphery of said first member defining a first notch in said first member and a first edge between said inner and outer peripheries of said first member, said second member having a corresponding mating end meeting said first member, said mating end having a second longitudinal extension only along said outer periphery of said second member, said second longitudinal extension and the unextended outer periphery of said second member defining a second notch in said second member and a second edge between said inner and outer peripheries of said second member, said first extension received within said second notch and said second extension received within said first notch such that said first and second edges oppose; and a flexible sealing element bonded to the assembled rigid carrier.

2. A gasket as claimed in claim 1, wherein said flexible sealing element is interposed between said edges at said joint.

3. A gasket as claimed in claim 2, wherein said first and second edges include complementary undulations, defining a gap therebetween.

4. A molded gasket for sealing between two opposed surfaces, comprising:

a rigid carrier formed of at least two carrier members cooperatively defining a substantially closed annulus having an inner periphery and an outer periphery, said carrier members meeting at an offset joint;

said joint interconnecting a first and a second member, said joint characterized by a first longitudinal extension of said first member only along said inner periphery, said first longitudinal extension and the unextended outer periphery of said first member defining a first notch in said first member and a first edge between said inner and outer peripheries of said first member, said second member having a corresponding mating end meeting said first member, said mating end having a second longitudinal extension only along said outer periphery of said second member, said second longitudinal extension and the unextended outer periphery of said second member defining a second notch in said second member and a second edge between said inner and outer peripheries of said second member, said first extension received within said second notch and said second extension received within said first notch such that said first and second edges oppose; and a flexible sealing element bonded to the assembled rigid carrier.

5. A gasket as claimed in claim 4, wherein said flexible sealing element is interposed between said edges at said joint.

6. A gasket as claimed in claim 5, wherein said first and second edges include complementary undulations, defining a gap therebetween.

* * * * *